(12) United States Patent
Bansal et al.

(10) Patent No.: US 11,630,745 B2
(45) Date of Patent: *Apr. 18, 2023

(54) EFFICIENT RECOVERY OF BACKUPS FOR DELETED CHECKPOINTS

(71) Applicant: EMC IP Holding Company LLC, Hopkinton, MA (US)

(72) Inventors: Aaditya Rakesh Bansal, Bangalore (IN); Sunil Yadav, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,262

(22) Filed: Mar. 24, 2022

(65) Prior Publication Data

US 2022/0214947 A1 Jul. 7, 2022

Related U.S. Application Data

(63) Continuation of application No. 16/158,075, filed on Oct. 11, 2018, now Pat. No. 11,294,778.

(51) Int. Cl.
*G06F 11/00* (2006.01)
*G06F 11/14* (2006.01)
*G06F 9/455* (2018.01)

(52) U.S. Cl.
CPC ......... *G06F 11/1469* (2013.01); *G06F 9/455* (2013.01); *G06F 9/45558* (2013.01); *G06F 11/1464* (2013.01); *G06F 2009/45583* (2013.01); *G06F 2009/45595* (2013.01); *G06F 2201/815* (2013.01)

(58) Field of Classification Search
CPC ............. G06F 11/1448; G06F 11/1451; G06F 11/1453; G06F 11/1458; G06F 11/1464; G06F 11/1469; G06F 9/45558; G06F 2009/45562; G06F 2009/45583
See application file for complete search history.

(56) References Cited

U.S. PATENT DOCUMENTS

| | | | |
|---|---|---|---|
| 9,424,136 B1 | 8/2016 | Teater et al. | |
| 9,430,546 B2 * | 8/2016 | Poirier | G06F 16/27 |
| 9,740,577 B1 | 8/2017 | Chakraborty et al. | |
| 10,838,826 B2 | 11/2020 | Bajaj | |
| 11,294,778 B2 * | 4/2022 | Bansal | G06F 9/45558 |
| 2016/0231944 A1 | 8/2016 | Litke et al. | |

* cited by examiner

*Primary Examiner* — Marc Duncan
(74) *Attorney, Agent, or Firm* — Workman Nydegger

(57) ABSTRACT

Backup operations may save a full backup and subsequent checkpoints. Systems and methods for handling backup and restore operations when checkpoints are deleted. Checkpoints can be merged during a restore operation to account for deleted checkpoints. Also, the backup can continue to leverage existing backups even though checkpoints have been deleted.

20 Claims, 9 Drawing Sheets

EFFICIENT RECOVERY OF BACKUPS FOR DELETED CHECKPOINTS

FIELD OF THE INVENTION

Embodiments of the invention relate to systems and methods for performing data protection operations. More particularly, embodiments of the invention relate to systems and methods for performing backup operations and restore operations in virtual environments.

BACKGROUND

Virtual environments (such as Microsoft Hyper-V Environments) often support the creation of checkpoints. Checkpoints, in one example, may be point-in-time snapshots of data or of a virtual machine that can be created on demand. When a checkpoint is created, the parent disk becomes read-only and all changes from that point on (time at which checkpoint is created) are tracked by a differencing disk. The virtual environment typically runs from the latest differencing disk, although any of the disks in the checkpoint chain can be used.

When performing a backup operation on a virtual environment that uses or includes checkpoints, a full backup may be synthesized from the checkpoints. Synthesized backup solutions keep track of virtual chains (e.g., related checkpoints). As a result, the backup may include the checkpoints present on a host. More specifically, these types of solutions keep track of virtual chains and try to ensure that the data present on the host is correctly mapped to the data present on the backup server.

Unfortunately, any change in the virtual disk chain at a host or of a target is treated as a mismatch or an exception with respect to the backup and often results in triggering a full backup of the virtual disk (or machine). However, this type of change typically does not involve data. This creates an inefficiency by requiring a full backup to be performed when the change in the virtual disk chain is not related to the data itself. This increases the backup window and results in processing that is not needed. Systems and methods are needed to improve the functioning of data protection systems.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
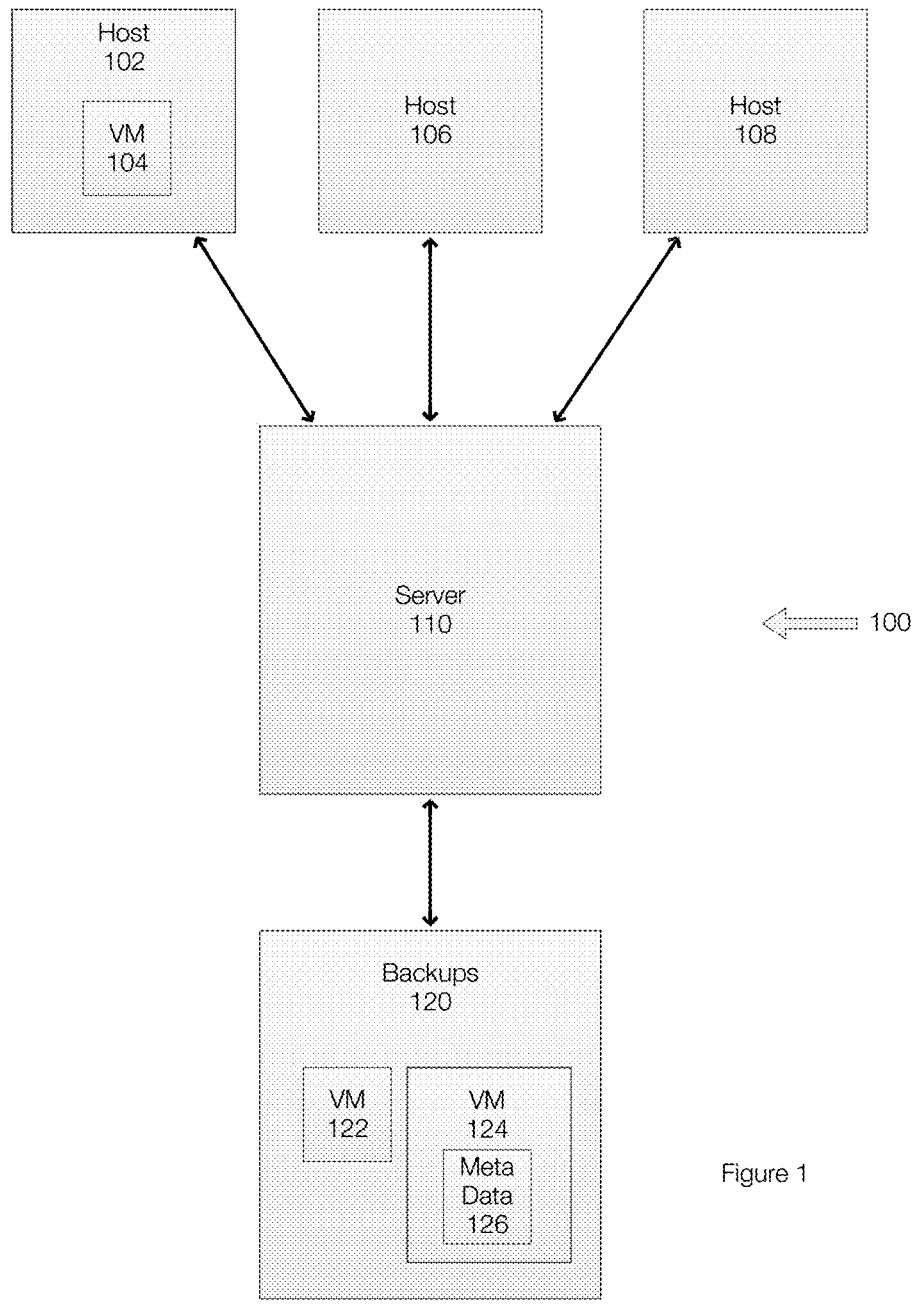
FIG. 1 illustrates an example of an environment in which data protection operations are performed and illustrates backups associated with virtual machines.

Embodiments of the invention relate to performing data protection operations that may include, but are not limited to, backup operations, restore operations, de-duplication operations, mirroring operations, or the like or combination thereof. Embodiments of the invention further relate to systems and methods for improving the efficiency of data protection operations, particularly when changes in the virtual environment do not strictly relate to the addition, change, and/or deletion of data.

In a virtual environment, such as an environment in which virtual machines are present and operating, multiple checkpoints (e.g., snapshots) can be created for each of the virtual machines in the environment. When a new checkpoint is created, a differencing disk (or child disk) is created that tracks the changes in the selected disk or virtual machine from the point in time at which the checkpoint is created. Over time, a chain of checkpoints or a disk chain of related disks is created. A backup operation may backup the chain of checkpoints. A full backup can be synthesized if desired from the chain of checkpoints.

In addition to creating checkpoints, checkpoints may also be deleted. When a checkpoint or differencing disk is deleted at the host, the data present in the differencing disk is merged into its' parent disk in the disk chain and the deleted differencing disk is removed from the disk chain. In this case, the data is not deleted, changed, or added. Rather, there is a rearrangement of data in the disk chain. As previously stated, this conventionally results in a mismatch between the contents of the target virtual machine or host with respect to the contents of a backup stored on the backup server. As a result, a full backup is conventionally taken and the contents of the old backup cannot be leveraged. This may consume bandwidth and resources that could be used for another purpose.

Embodiments of the invention improve the functioning of the computer or of the backup operation and relate to systems and methods for handling situations that conventionally resulted in a full backup operation. When a backup operation is performed, the backup server (and/or an agent operating on a host or virtual machine) may identify the checkpoints that have been deleted or merged as well as their immediate parent and child. Next, computations related to merging data from one or more differencing disks (the deleted checkpoints) to another differencing disk (the immediate parent) are performed. This information is often saved as metadata that is associated with the backup being performed. This metadata may include data that allows the checkpoints from the old backup to be merged during a restore operation. Advantageously, rather than transferring all of the data to perform a full backup, none of the data pertaining to the deleted checkpoints are transferred. Only new data in the recovery snapshot is considered for transfer.

Advantageously, the recovery window is reduced as only the merged data is recovered rather than individual files in one example. Storage requirements are minimized because the final output being recovered is already merged. The backup window is also minimized because there is no data transfer of the merged filed. Only the newly added data in the recovery snapshot is transferred.

This procedure allows the existing backup to be leveraged in the new backup and allows a recovery operation to be performed using a backup that does not exactly match the current configuration of the host because some of the checkpoints have been deleted at the host. This is accomplished by storing metadata with the new backup that allows the checkpoints to be merged during the recovery operation. The merged data is copied to a destination during recovery of the virtual machine.

FIG. 1 illustrates an example of a computing environment 100 in which data protection operations are performed. FIG. 1 illustrates hosts 102, 106 and 108. The hosts may be hardware, virtualized hardware or the like including memory, a processor and other necessary hardware. The hosts may support virtual machines. In this example, a virtual machine (VM) 104 is operating on the host 102. Each of the hosts 102, 106 and 108 may support multiple virtual machines.

A server 110 is an example of a backup server that stores backups 120 on a storage device (disk arrays, cloud storage, etc.). FIG. 1 illustrates a backup VM 122 and a backup VM 124, which are both backups of the VM 104. The VM 122 is earlier in time than the VM 124.

Between the creation of the VM 122 and the VM 124, checkpoints associated with the VM 104 were deleted. However, the disk chain included in the backup VM 122 is identical to the disk chain included in the backup VM 124. The backup VM 124, however, also includes metadata 126 or merge data that allows the VM 104 to be recovered as the VM 104 presently exists on the host 102.

More specifically, when the checkpoints were deleted on the VM 104, the disk chain changed to a new disk chain at the host 102. During a recovery operation, the metadata 126 allows the deleted checkpoints or differencing disks to be merged such that the recovered VM 104 includes a disk chain that looks like the new disk chain. This process is further illustrated in the following discussion.

Figure 2:
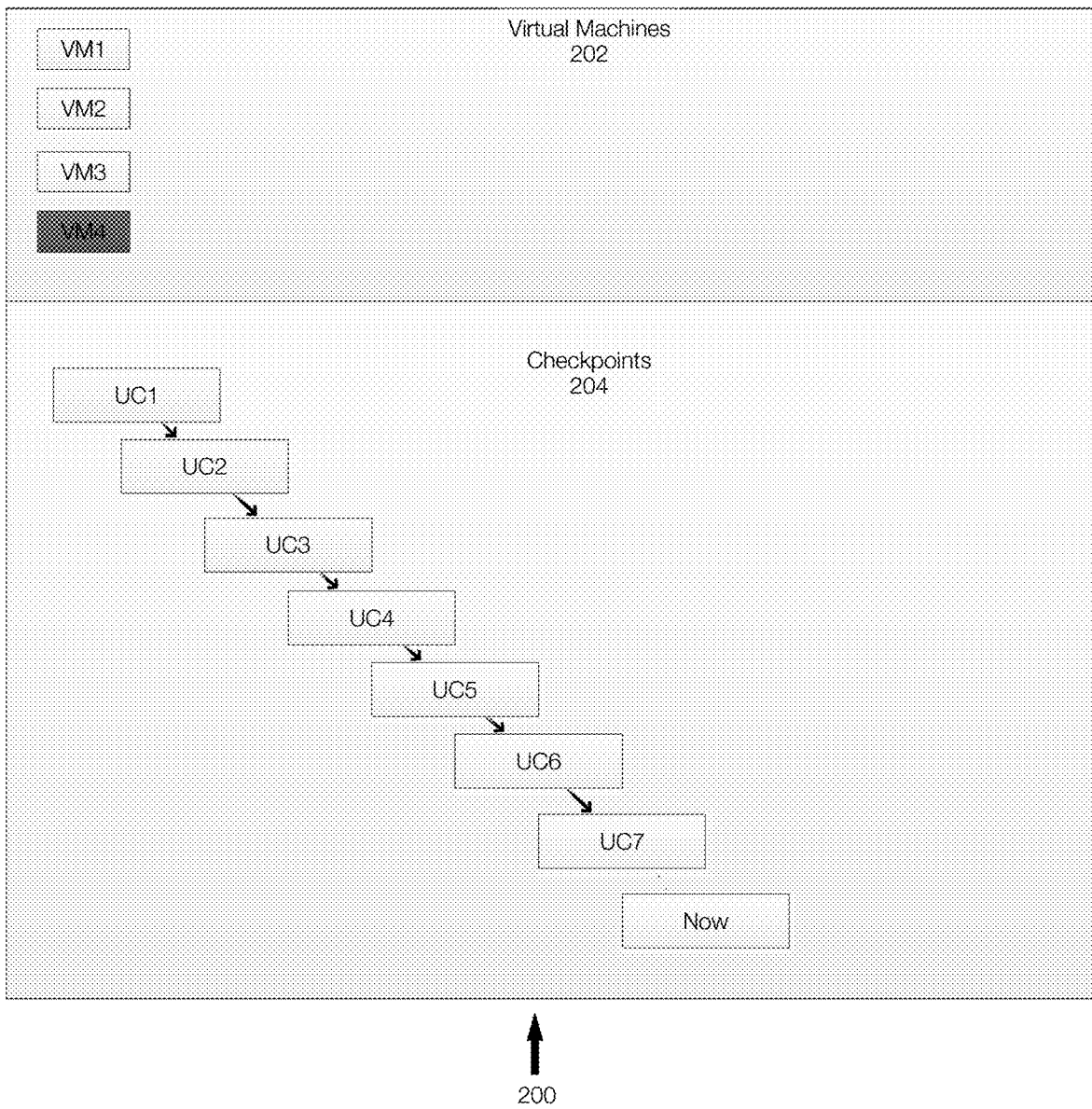
FIG. 2 illustrates an example of a virtual machine manager or a user interface illustrating checkpoints associated with a virtual machine.

FIG. 2 illustrates a virtual machine manager 200 or a user interface of the virtual machine manager 200. FIG. 2 illustrates some of the virtual machines 202 that may be present on one or more hosts in a virtual environment. The virtual machines 202 include VM1, VM2, VM3, and VM4. In this example, VM4 has been highlighted or selected. The lower portion of the manager 100 illustrates checkpoints 204 associated with VM4. The checkpoints 204 represent a linked disk chain where each of the checkpoints may be associated with a parent and/or a child. The entire disk chain is represented as follows: Parent disk→UC1→UC2→UC3→UC4→UC5→UC6→UC7.

In this example, each child disk tracks the changes made with respect to its immediate parent. For example, UC2 tracks the changes made to data or to the virtual machine with respect to UC1 and UC7 tracks changes made to data or to the virtual machine with respect to UC6. The other checkpoints are similar. Each time a checkpoint is created, the parent disk to the new checkpoint may become read-only and all changes from that point forward are tracked by the new child disk or by the new differencing disk. For example, when the checkpoint UC4 is created, the disk UC4 becomes read only and all changes from that point on are tracked in UC5.

Figure 3:
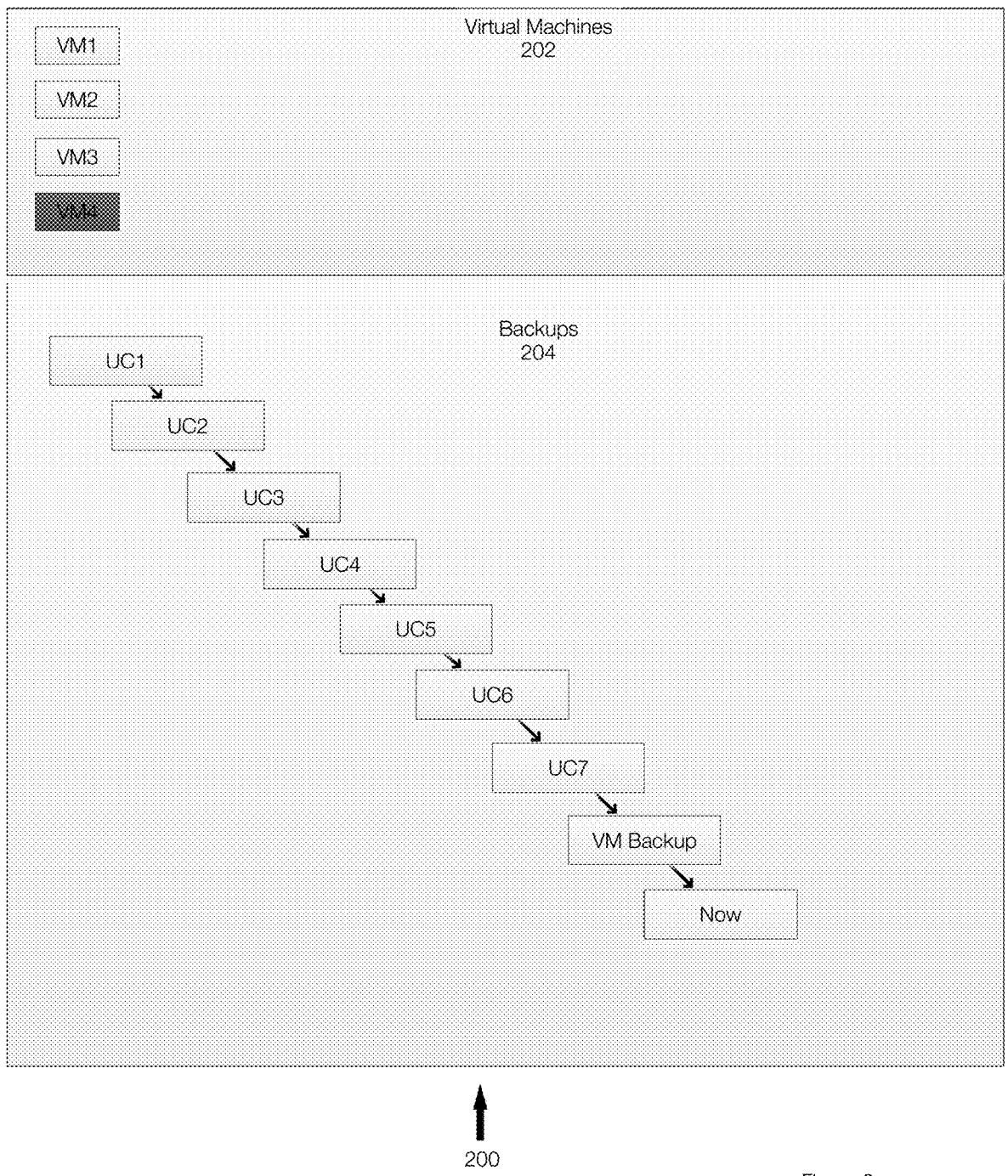
FIG. 3 illustrates an example of taking a backup of a virtual machine.

FIG. 3 illustrates the manager 200 when a synthesized full backup (VM Backup) is performed or initiated. FIG. 3 illustrates an example of a status of the host (e.g., the host 102) after the synthesized backup. In the full backup, the entire disk chain is backed up to the backup server as is in one example.

Figure 4:
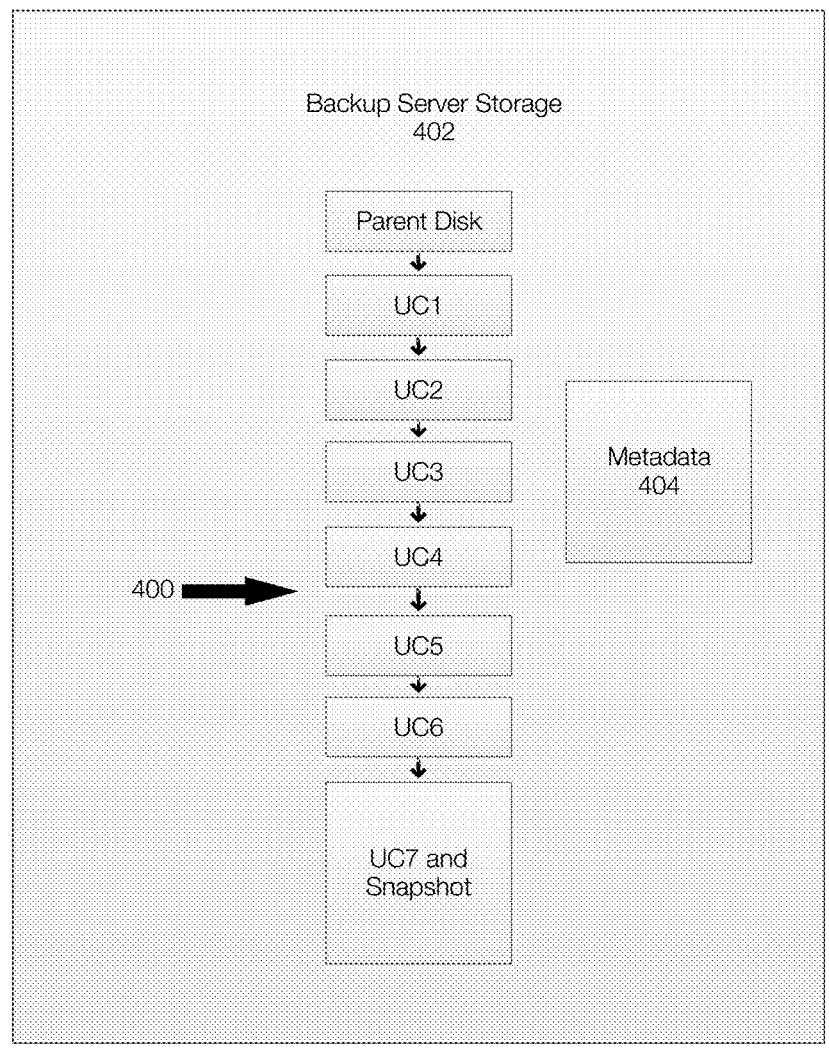
FIG. 4 illustrates an example of a backup of a virtual machine stored on a storage device.

FIG. 4 illustrates an example of a full backup 400 of the VM4 in the backup server storage 402. More specifically, FIG. 4 illustrates an example of the full backup of the disk chain (or of the virtual machine VM4) illustrated in FIGS. 2 and 3. The full backup 400 includes a disk chain that is identical to the disk chain shown in FIG. 3: parent disk→UC1→UC2→UC3→UC4→UC5→UC6→UC7. The full backup may also include a snapshot representing any changes made to the virtual machine.

There may be some differences, however, between the disk chain on the host and the backup of the disk chain stored in the backup server storage 402. The full backup 400 is also associated with metadata 404. The metadata 404 includes data related to the entire disk chain and individual relationships between the various checkpoints. The metadata 404, for example, may identify parent child relationships.

Figure 5:
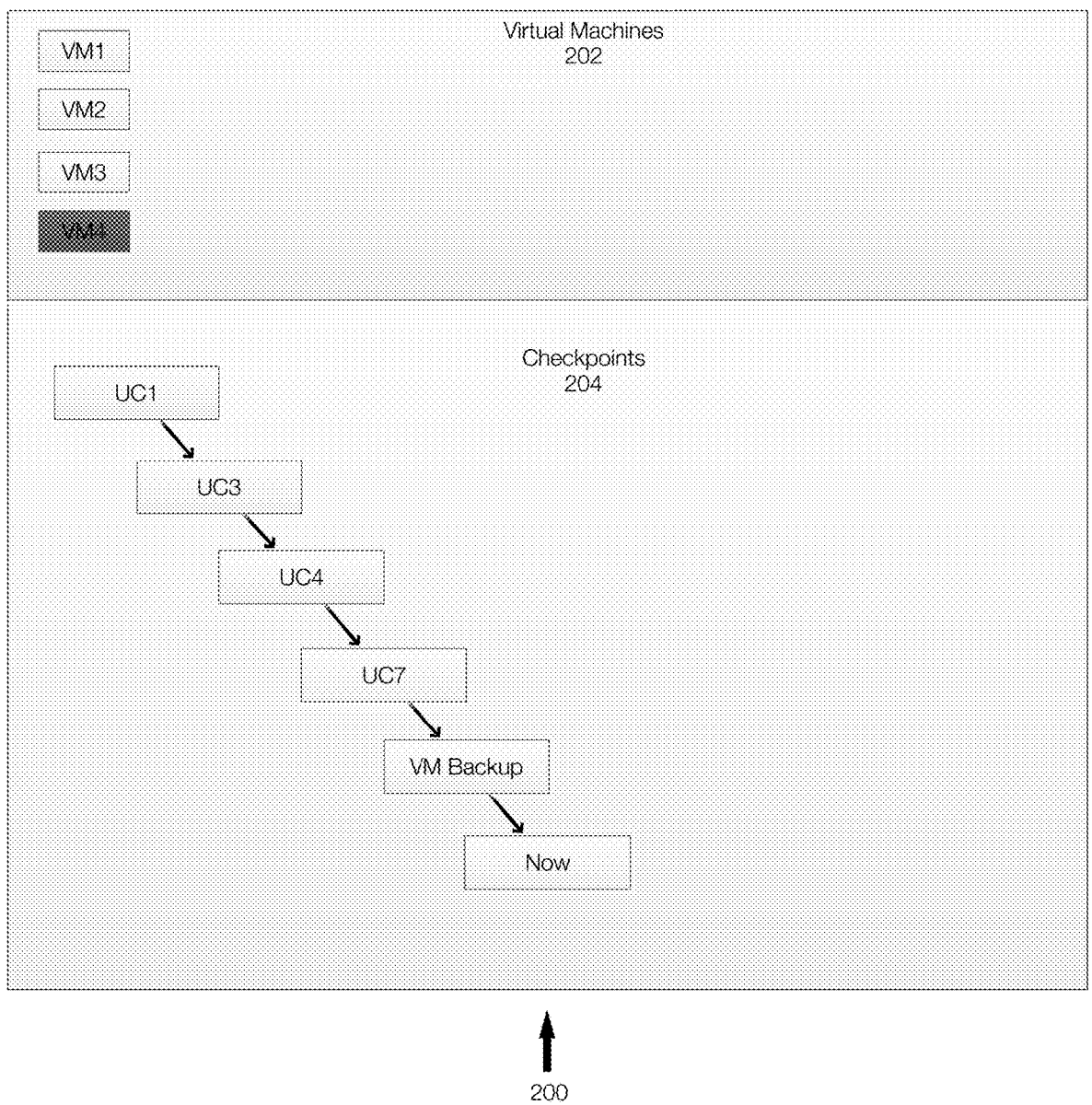
FIG. 5 illustrates an example of a disk chain where some of the checkpoints have been deleted.

During operation of a virtual machine, a checkpoint may be changed or deleted as previously stated. Returning to the manager 200 in FIG. 5 and with regard to VM4, FIG. 5 illustrates that some of the checkpoints shown in FIGS. 2 and 3 have been deleted. In particular, checkpoints UC2, UC5 and UC6 have been deleted from the disk chain.

When a checkpoint is deleted, the checkpoints being deleted (or the corresponding differencing disks) are merged into their parent disk. Thus, data from checkpoint UC2 is merged into UC1. Checkpoints UC6 and UC5 are both similarly merged into UC4. This results in a new disk chain that can be represented as follows: Parent disk→UC1*→UC3→UC4*→UC7. UC1* represents the merging of differencing disk UC2 into differencing disk UC1. Similarly, UC4* represents the merging of differencing disks UC5 and UC6 into differencing disk UC4.

The deletion of a checkpoint can introduce problems into the backup process at least because the disk chain that now exists on the host (as shown in FIG. 5) is different from the previous disk chain that exists at the backup server (as shown in FIG. 4). Conventionally, this prevents the system from being able to leverage the existing backup 400 and may unnecessarily result in a full backup. In addition, this results in extra processing and bandwidth use because the entire backup disk chain must be backed up to the backup storage.

Embodiments of the invention improve the functioning of the computing system and of the system by creating a backup that accounts for these changes without having to perform a full backup of the entire disk chain. The existing backup can be leveraged to generate a new full backup.

When a new backup is initiated, the modifications in the disk chain are verified. If there is a modification, the changed relationships are checked and noted. This is reflected in the present example. More specifically, UC3 is now the child of UC1, UC7 is now the child of UC4, data from UC2 has been merged into UC1, and data from UC5 and UC6 have been merged together in UC4.

When there is no other data change, this information (parent-child relationships) is sent to the backup server along with the new configuration files for the target or host (e.g., VM4). Metadata pertaining to merging the data from single or multiple differencing disks onto another differencing disk is determined and saved to the server.

With respect to merging data from the deleted checkpoints (or from the corresponding differencing disks) onto another differencing disk, the data sector index remains the same throughout the disk chain.

For example, embodiments of the invention may identify the individual chains to be merged in terms of the immediate parent and the most recent or latest child. In this example, this results in two merged chains or sub-chains. The first merged chain includes or relates to parent UC1 and disk chain UC2. The second merged chain includes parent UC4 and disk chain UC6 (latest child) followed by UC5.

When performing the backup of the VM or host and in order to leverage the backup already stored by the backup server, embodiments of the invention determine or compute metadata from the disks in the disk chain. This metadata is stored in merge chains. The merge chains allow the merged disks to be generated during the recovery operation. This allows the backup to include, in one example, the previous backup along with merge chains or other metadata.

Figure 6:
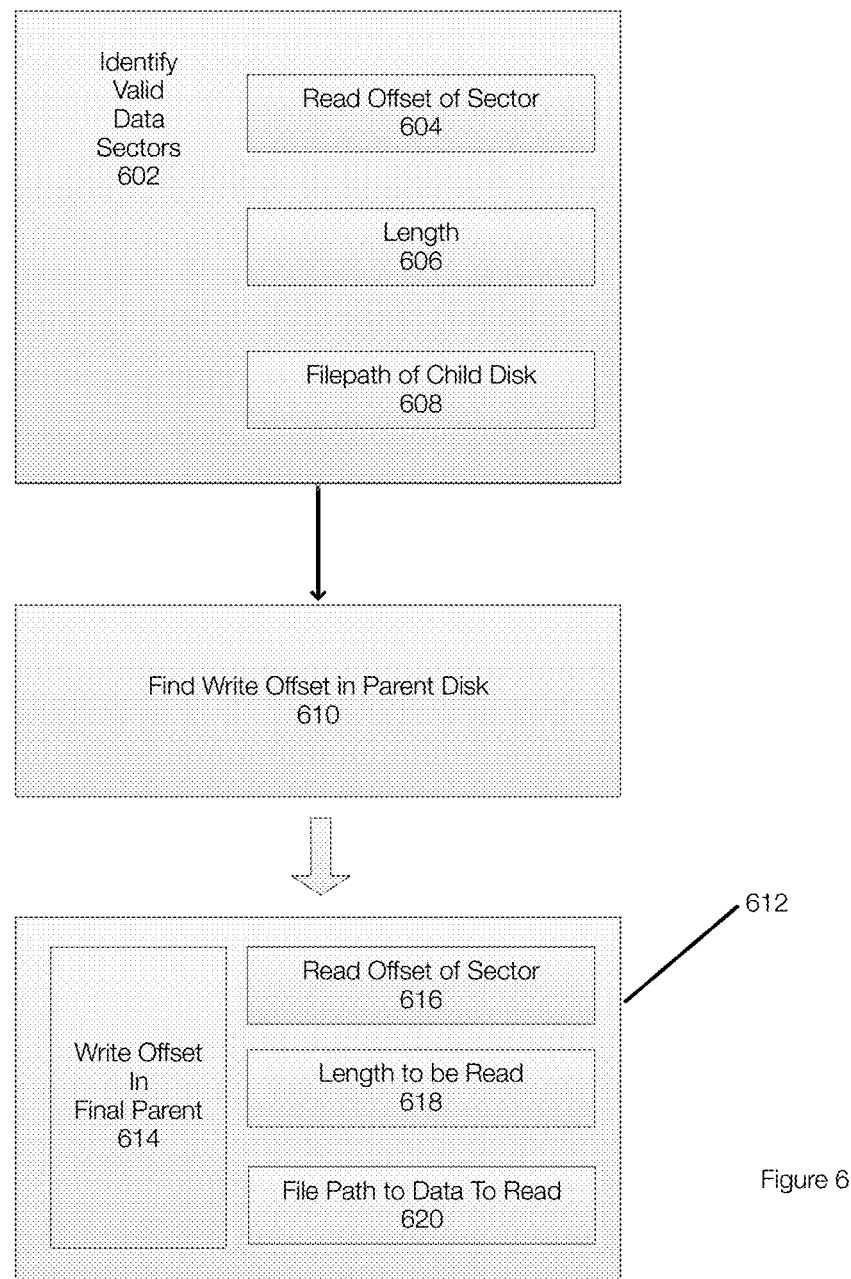
FIG. 6 illustrates an example of a method for generating metadata or a merge chain to include in a backup of the disk chain shown in FIG. 5.

FIG. 6, for example, illustrates a method for generating merge chain metadata. Consider disks UC1 and UC2. In this case, the valid data sectors are identified in the child disk UC2 at 602. This can be performed by parsing the disk to identify valid blocks and non-valid blocks. When a valid sector is identified, certain metadata is stored. This includes a read offset of sector 604, a length 606 to be read, and a filepath of the child disk 608. This process may be performed for each child disk in the chain or with respect to disks that have been merged. Thus, a merge chain may be generated for UC1 and UC2. Similarly, another merge chain may be generated for UC4, UC5, and UC6. Because the data sector index remains the same throughout the disk chain, this information allows the disks to be merged during a recovery operation.

Next, the write offset of this sector in the parent disk is located at 610. This may include several acts or steps. Using the block allocation table (BAT) of the parent disk, the corresponding write offset is located and stored in the merge chain. If the block is not present, a new block or virtual block is allocated to store the new incoming sector. In a case where a new block is to be allocated, the updated BAT is also saved and will be used to carve out the merged disk during recovery. This information is part of and included in the merge chain metadata. If a data sector is not present in the latest disk, the same data sector is searched for in its immediate parent until the final parent disk is reached in the context of the merged disks.

This process allows the information about what the final merged disk should include in the form of a mapping. The merge chain metadata 612 is shown in FIG. 6. The metadata thus associates a write offset in final parent 614 with a read offset of sector 616 in a child disk, a length to be read 618, and a file path of the data to be read 620. This metadata is computed and stored along with the configuration files for the current backup. Advantageously, no actual data is transferred with respect to the merged disks.

During a recovery operation, this metadata is used to generated the merged checkpoints. In effect, data stored in the child disks of a given merge chain are written to the parent disk (and replacing data in some instances). For example, if a parent stores data a, b, c, d, and e in blocks 1, 2, 3, 4, and 5 and if the child disk has valid data at block 3 of q, then block 3 of the parent (c) is overwritten with q using the metadata 612.

Figure 7:
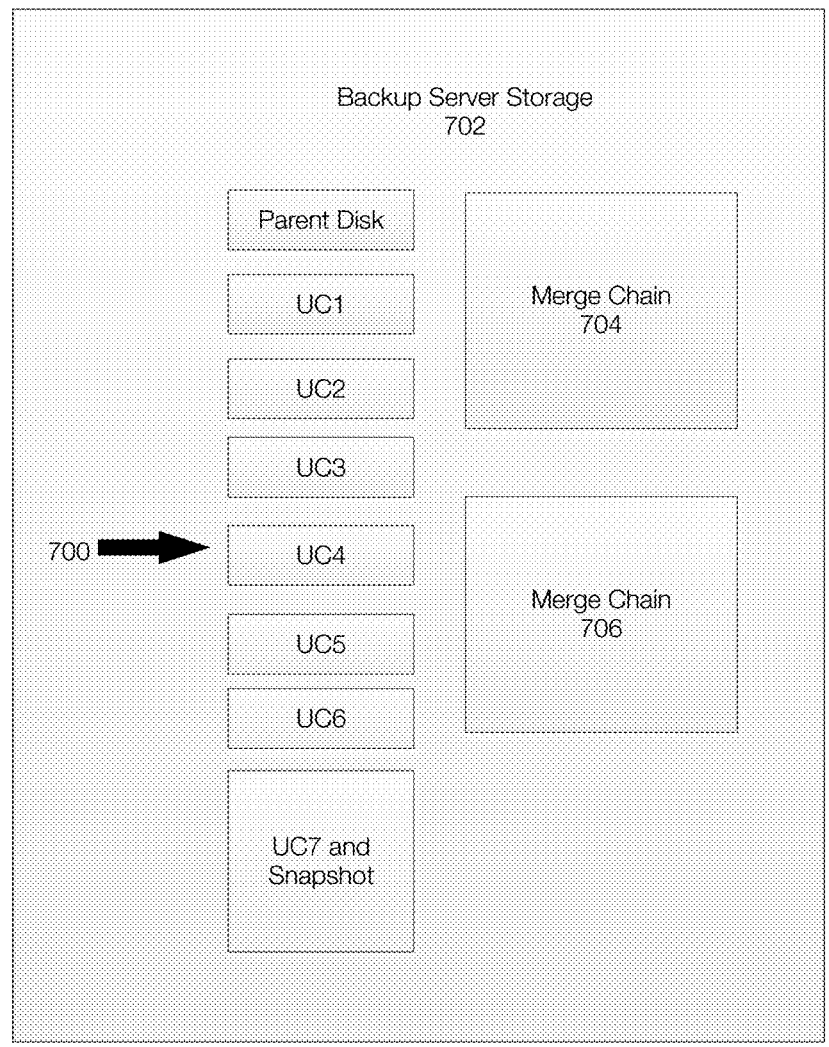
FIG. 7 illustrates an example of a backup of the disk chain shown in FIG. 5.

FIG. 7 illustrates backup server storage 702 (which may be the same as backup server storage 402). FIG. 7 illustrates a backup of the virtual machine (VM4) or of the disk chain after the checkpoints have been deleted at the host. In FIG. 7, the backup 700 includes the same disk chain shown in FIG. 4 as part of the backup. The backup 700, however, also includes a merge chain 704 and a merge chain 706. This allows the backup to be taken without having to actually transfer all of the data. Rather, the merge chains 704 and 706 allow the disk chain associated with the synthesized backup to be reconstructed during a recovery operation. Thus, the existing backup can be leveraged.

More specifically, the merge chain 704 allows the recovery operation to generate UC1*, which includes the data of UC2 or which represents UC2 merged into UC1. The merge chain 706 allows the recovery operation generate UC4*, which includes the data from UC5 and UC6 or which represents UC5 and UC6 merged into UC4. Each of the merge chains includes a mapping of data to be written and its corresponding location and file path, an updated BAT table of the parent if applicable, and information relating to updating the parent disk in the child disk metadata.

When a recovery operation is performed for this backup 700 shown in FIG. 7, the merge chains 704 and 706 are used to generate the merged disks. After checking the metadata and/or the merge chains, the data streams for files are modified to reflect the new changes per the mapping metadata included in the merge chains 704 and 706. Thus, the parent disk, UC1*, UC3 and UC4* and UC7 are recovered from the backup 700. For UC1*, the data stream leverages the metadata from the merge chain 704 to create a new disk containing the merged data from UC2 and UC1. Similarly, for UC4*, the data stream uses the corresponding metadata in the merge chain 706 to create a final disk containing data from UC4, UC5 and UC6.

Figure 8:
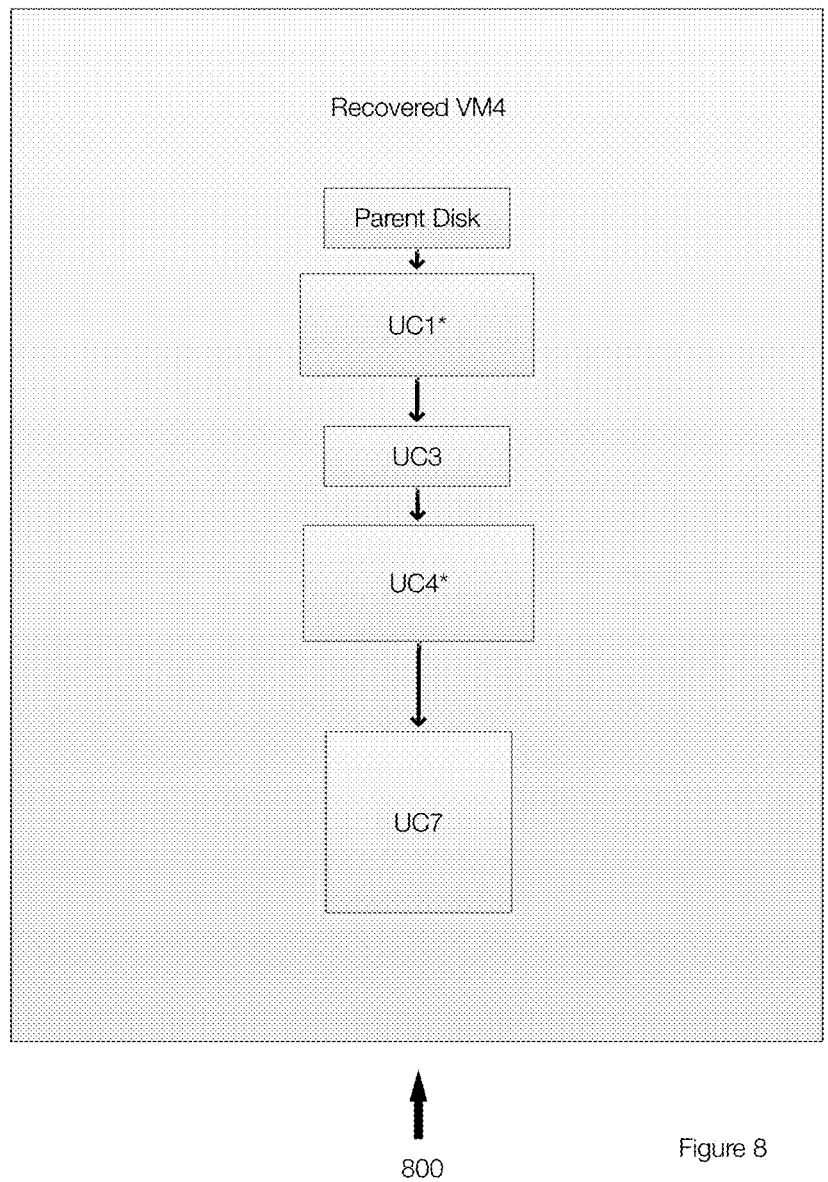
FIG. 8 illustrates an example of a virtual machine that has been recovered from the backup shown in FIG. 7.

FIG. 8 illustrates an example of the recovered virtual machine on a host from the backup 700 shown in FIG. 7. Thus, the recovered VM4 800 shown in FIG. 8 includes the Parent disk, UC1*, UC3, UC4* and UC7.

Advantageously, the recovery of the virtual machine is successful without any additional storage requirement or increase in the recovery window.

Figure 9:
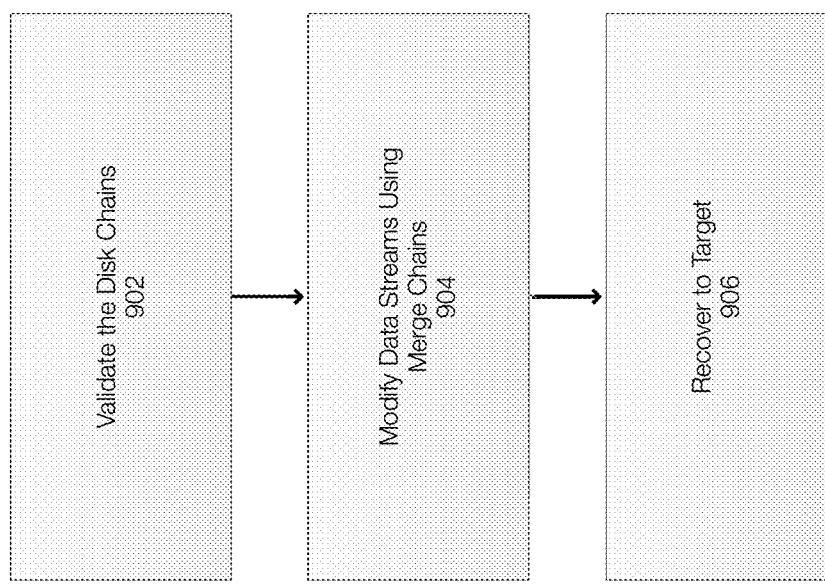
FIG. 9 illustrates an example of a method for recovering a virtual machine from a backup shown in FIG. 7.

FIG. 9 illustrates an example of a method for recovering a virtual machine from a backup. The method shown in FIG. 9 may begin by validating 902 the disk chain in a backup or the disk chain to be backed up. This may include checking the disk chain to identify parent/child relationships. Next, the data streams are modified 904 using the merge chains. Thus, the data stream can leverage the merge chain metadata to create a new disk. For example, the data stream may create a new disk UC1* containing the data from UC2 and UC1. Similarly, the data stream may create a new disk UC4* containing the data from UC6, UC5 and UC4. The backup is then recovered 906 to the target or to a selected host.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a backup operation of a virtual machine that is associated with a plurality of checkpoints, the method comprising:
   determining that a checkpoint has been deleted from a disk chain, wherein the disk chain includes a plurality of related checkpoints;
   creating a merge chain related to the disk chain by merging checkpoints in the disk chain, wherein the merge chain includes metadata for the checkpoints to be merged, wherein creating the merge chain includes finding valid sectors of a child checkpoint and, for each sector, determining a read offset of the sector, a length to be read, and a file path of the child checkpoint; and
   determining a write offset in a parent checkpoint associated with the merge chain; and
   storing, for each sector, the read offset, the length to be read, the file path and the write offset in the merge chain.

2. The method of claim 1, wherein the disk chain is stored at a host and wherein the disk chain is stored as a backup on a backup server.

3. The method of claim 2, further comprising deleting the checkpoint from the host.

4. The method of claim 3, further comprising creating the merge chain at the backup server.

5. The method of claim 4, further comprising creating the merge chain without transferring data from the checkpoint corresponding to the checkpoint that has been deleted at the host.

6. The method of claim 5, further comprising performing a restore operation from the backup server.

7. The method of claim 6, further comprising synthesizing the backup using the merge chain and a previous backup to create a synthesized backup.

8. The method of claim 7, further comprising generating a new disk chain, wherein a checkpoint in the new disk chain includes a disk that includes data from the child checkpoint and the parent checkpoint.

9. The method of claim 8, further comprising recovering a virtual machine during the restore operation from the synthesized backup.

10. The method of claim 9, further comprising including new data in the synthesized backup.

11. A non-transitory computer readable medium comprising instructions for performing a method for performing a backup operation of a virtual machine that is associated with a plurality of checkpoints, the method comprising:
    determining that a checkpoint has been deleted from a disk chain, wherein the disk chain includes a plurality of related checkpoints;
    creating a merge chain related to the disk chain by merging checkpoints in the disk chain, wherein the merge chain includes metadata for the checkpoints to be merged, wherein creating the merge chain includes finding valid sectors of a child checkpoint and, for each sector, determining a read offset of the sector, a length to be read, and a file path of the child checkpoint; and determining a write offset in a parent checkpoint associated with the merge chain; and storing, for each sector, the read offset, the length to be read, the file path and the write offset in the merge chain.

12. The non-transitory computer readable medium of claim 11, wherein the disk chain is stored at a host and wherein the disk chain is stored as a backup on a backup server.

13. The non-transitory computer readable medium of claim 12, further comprising deleting the checkpoint from the host.

14. The non-transitory computer readable medium of claim 13, further comprising creating the merge chain at the backup server.

15. The non-transitory computer readable medium of claim 14, further comprising creating the merge chain without transferring data from the checkpoint corresponding to the checkpoint that has been deleted at the host.

16. The non-transitory computer readable medium of claim 15, further comprising performing a restore operation from the backup server.

17. The non-transitory computer readable medium of claim 16, further comprising synthesizing the backup using the merge chain and a previous backup to create a synthesized backup.

18. The non-transitory computer readable medium of claim 17, further comprising generating a new disk chain, wherein a checkpoint in the new disk chain includes a disk that includes data from the child checkpoint and the parent checkpoint.

19. The non-transitory computer readable medium of claim 18, further comprising recovering a virtual machine during the restore operation from the synthesized backup.

20. The non-transitory computer readable medium of claim 19, further comprising including new data in the synthesized backup.

* * * * *